United States Patent
Tiemann

(10) Patent No.: US 7,925,462 B2
(45) Date of Patent: Apr. 12, 2011

(54) POSITION-MEASURING DEVICE AND METHOD FOR TRANSMITTING INFORMATION CONCERNING MOVEMENT

(75) Inventor: Marc Oliver Tiemann, Nussdorf/Sondermoning (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 405 days.

(21) Appl. No.: 12/184,424

(22) Filed: Aug. 1, 2008

(65) Prior Publication Data

US 2009/0037127 A1 Feb. 5, 2009

(30) Foreign Application Priority Data

Aug. 2, 2007 (DE) .......................... 10 2007 036 542

(51) Int. Cl.
*G01P 21/00* (2006.01)
(52) U.S. Cl. ............ 702/94; 702/85; 702/150; 318/573; 318/568.24; 324/207.25
(58) Field of Classification Search .............. 702/94–95, 702/85, 150; 318/573, 568.24; 324/207.25
See application file for complete search history.

(56) References Cited

U.S. PATENT DOCUMENTS 5,092,051 A * 3/1992 Holmer et al. .................. 33/1 N
* cited by examiner

*Primary Examiner* — Drew A Dunn
*Assistant Examiner* — Hien X Vo
(74) *Attorney, Agent, or Firm* — Kenyon & Kenyon LLP

(57) ABSTRACT

In a position-measuring device and a method for transmitting movement information from a position-measuring device to sequential electronics, the position-measuring device includes a position-measuring unit, a movement-measuring unit, an arithmetic logic unit and an interface unit. Position values of two objects in a measuring direction are measurable by the position-measuring unit. The movement-measuring unit is used to ascertain a movement value of the two objects. The position values and the movement value are supplied to the arithmetic logic unit which ascertains movement information in the form of a correction value that is suitable for calculating the movement value in sequential electronics from an instantaneous position value, at least one previous position value, a controller cycle time that indicates the time interval between the measurements of position values, and the correction value. The data-word length of the correction value is substantially less than the data-word length of the movement value.

18 Claims, 3 Drawing Sheets

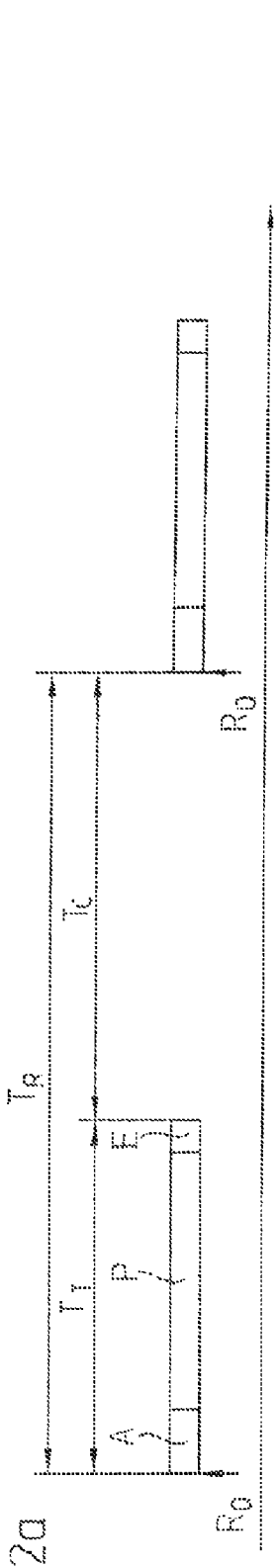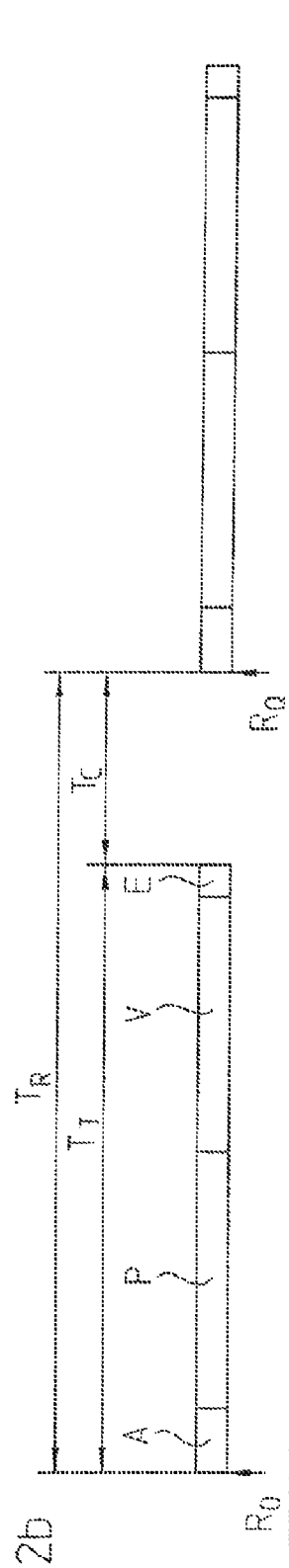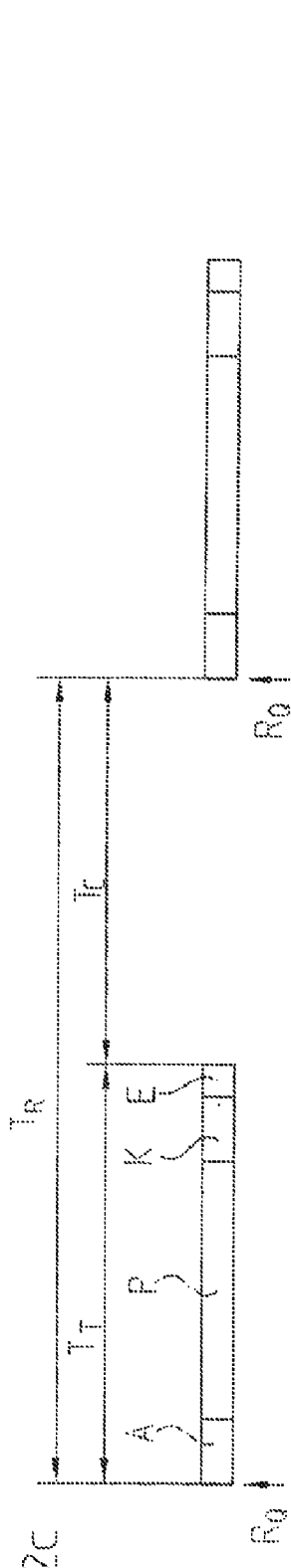

US 7,925,462 B2

POSITION-MEASURING DEVICE AND METHOD FOR TRANSMITTING INFORMATION CONCERNING MOVEMENT

CROSS-REFERENCE TO RELATED APPLICATIONS

The present application claims priority to Application No. 10 2007 036 542.1, filed in the Federal Republic of Germany on Aug. 2, 2007, which is expressly incorporated herein in its entirety by reference thereto.

FIELD OF THE INVENTION

The present invention relates to a position-measuring device and to a method for transmitting information concerning movement.

A position-measuring device of this kind is particularly suitable for use in a drive system. Using a position-measuring device according to example embodiments of the present invention and a method according to example embodiments of the present invention makes it possible, in addition to transmitting positional data, to very efficiently transmit movement information, e.g., velocity information and/or acceleration information, to a drive control.

BACKGROUND INFORMATION

In automation technology, drives are frequently used whose motors are controlled by a numerical control (NC). To that end, depending on a program to be processed, the control generates setpoint values which are converted in suitable motor-control modules, referred to as converters, to form control signals for the motor. The movement resulting from the control signals may be both a longitudinal movement, e.g., the travel of a tool carriage in a machine tool, and a rotary movement, e.g., a tool spindle rotating with a specific speed or the rotation of an articulated joint of a production robot.

In order to be able to measure the extent of the movement, position-measuring devices are used. In the case of a longitudinal movement, linear position-measuring devices, for example, and in the case of rotary movements, rotary position-measuring devices, also referred to as rotary transducers, are used, which are coupled directly or via a speed-transforming gear to a motor shaft. At regular time intervals, referred to as the controller cycle time, the control retrieves actual position values from the position-measuring devices and uses these values to ascertain new setpoint values for the converters. Control loops of this kind permit precise control of the drive.

The position values may be transmitted from the position-measuring devices to the control in purely analog fashion, often in the form of two sinusoidal signals phase-shifted by 90° relative to each other, or also digitally in the form of square-wave counting signals, or by transmitting complex data words via data interfaces. In modern position-measuring devices, serial data interfaces are considered to be preferred, since they require only a small number of lines for the data transmission, and permit the transmission of absolute position values.

To ascertain the setpoint values for the control loops, in addition to needing the actual position values, the drive control also needs further movement data such as the instantaneous velocity, or rotational speed, or perhaps the acceleration. If the controller cycle time is known, the velocity may be derived from two successively measured position values by forming the difference quotient. In a similar manner, the acceleration may be ascertained with the aid of three successively measured position values, or two successively calculated velocity values. However, motion values calculated in this manner represent only an average value with which the controlled drive has covered the distance from the first to the second and possibly the third position.

In practice, the actual velocity of a drive at a specific measuring instant may deviate considerably from the average value. For example, this may have mechanical causes, such as imbalances in the motor shafts, frictional effects or load change produced, for example, by the engagement of a tool with a workpiece. However, particularly problematic are errors of the position-measuring device, especially quantization errors, since the shorter the controller cycle time and the smaller the difference between two successively measured position values resulting therefrom, the stronger the effect of these errors. If the average value, which is based on successively measured position values, is used for ascertaining a new velocity setpoint value, because of the discrepancy between the actual velocity at the measuring instant and the average value, undesirable control fluctuations can occur which can lead to heating of the drive motor, to annoying noise generation, or perhaps to vibrations due to resonance effects.

Modern position-measuring devices, especially those which, by the use of large-scale integrated signal-processing units, e.g., in the form of a microcontroller or corresponding structures in an application-specific integrated component (ASIC), are able to carry out complex calculating operations, often themselves can already ascertain movement values, particularly velocity and acceleration values, with high accuracy. However, since in this case both the instantaneous position value and at least one movement value, for example, the velocity value, must be transmitted from the position-measuring device to the control, assuming a constant controller cycle time, the time available to the control after receiving the instantaneous actual values to perform the necessary calculations for ascertaining the new setpoint values is reduced. For this reason, especially when the data is transmitted via serial interfaces, this variant is often not usable because an increase in the data-transmission rate is associated with a high expenditure in material and costs.

SUMMARY

Example embodiments of the present invention provide a position-measuring device which allows efficient transmission of information concerning movement to sequential electronics.

According to example embodiments of the present invention, a position-measuring device includes a position-measuring unit, a movement-measuring unit, an arithmetic logic unit and an interface unit, where position values of two objects disposed in a manner allowing movement relative to each other in a measuring direction are measurable by the position-measuring unit, a movement value of the two objects disposed in a manner allowing movement relative to each other in a measuring direction is ascertainable by the movement-measuring unit, and the position values and the movement value are supplied to the arithmetic logic unit which ascertains movement information in the form of a correction value that is suitable for calculating the movement value in sequential electronics from an instantaneous position value, at least one previous position value, a controller cycle time which indicates the time interval between the measurements of position values, and the correction value, and the data-word length of the correction value is substantially less than the data-word length of the movement value.

The interface unit may be connected to the position-measurement unit, the movement-measurement unit, and the arithmetic logic unit by a data-request line that is configured to transmit data-request instructions that arrive from the sequential electronics at the interface unit.

The data-request instructions may arrive at the interface unit at the interval of the controller cycle time.

The interface unit may be configured to receive the instantaneous position value and the correction value and to transmit the instantaneous position value and the correction value to the sequential electronics.

The correction value may correspond to at least one of (a) a position-correction value, (b) a movement-correction value and (c) a time-correction value.

The arithmetic logic unit may include a memory configured to store at least one of (a) the controller cycle time and (b) the position values.

The interface unit may be connected by a data channel to an interface unit of the sequential electronics.

The data channel may be arranged as a serial interface connection.

The movement-measurement unit may include a sampling-clock generator configured to generate a sampling-clock signal having a period duration, the movement-measurement unit may be connected to the position-measurement unit by an auxiliary-data request line, and auxiliary position values may be requestable from the position-measurement unit by auxiliary-position request instructions.

The auxiliary position values may be requestable at an interval of the period duration of the sampling-clock signal, and the movement-measurement unit may be configured to receive the auxiliary position values and to ascertain the movement value at a measurement instant by forming an approximation function of a movement characteristic from the auxiliary position values and the period duration of the sampling-clock signal.

The movement-measurement unit may be arranged as a velocity-measurement unit, and the movement value may include a velocity value.

Example embodiments of the present invention provide a method which allows efficient transmission of information concerning movement from a position-measuring device to sequential electronics.

According to example embodiments of the present invention, a method is provided for ascertaining a correction value for the transmission of information concerning movement from a position-measuring device to sequential electronics, the position-measuring device including a position-measuring unit, a movement-measuring unit, an arithmetic logic unit and an interface unit, and the method includes: measurement of an instantaneous position value of two objects, disposed in a manner allowing movement relative to each other in a measuring direction, in the position-measuring unit; ascertainment of a movement value of the two objects, disposed in a manner allowing movement relative to each other in a measuring direction, in the movement-measuring unit; and ascertainment of the correction value in the arithmetic logic unit, the movement value being able to be calculated with the aid of the correction value in the sequential electronics from the instantaneous position value, at least one previous position value measured in a previous measuring cycle, and a controller cycle time which indicates the time interval between the measurements of position values, and the data-word length of the correction value is substantially less than the data-word length of the movement value.

The instantaneous position value, the movement value, and the correction value may be ascertained after receipt of a data-request instruction transmitted from the sequential electronics to an interface unit of the position-measuring device.

The method may include transmitting the instantaneous position value and the correction value to the sequential electronics by an interface unit of the position-measuring device.

The correction value may correspond to at least one of (a) a position-correction value, (b) a movement-correction value, and (c) a time-correction value.

The movement-measurement unit may include a sampling-clock generator configured to generate a sampling-clock signal having a period duration, the movement-measurement unit may be connected to the position-measurement unit by an auxiliary-data request line, by which auxiliary position values are requestable from the position-measurement unit based on auxiliary-position request instructions, and the movement value may be ascertained by: requesting auxiliary position values at an interval of the period duration of the sampling-clock signal; forming auxiliary movement values from the auxiliary position values and the period duration of the sampling-clock signal; forming an approximation function of a movement characteristic from the auxiliary movement values; and ascertaining the movement value at a measuring instant from the approximation function.

The movement-measurement unit may be arranged as a velocity-measuring unit configured to ascertain a velocity value as the movement value.

Further features and aspects of example embodiments of the present invention are described in more detail below with reference to the appended Figures.

BRIEF DESCRIPTION OF THE DRAWINGS

FIG. 2a is a timing diagram for the transmission of position values according to conventional systems.

FIG. 2b is a timing diagram for the transmission of position values and movement values according to conventional systems FIG. 2c is a timing diagram of a transmission of position values and correction values according to example embodiments of the present invention.

DETAILED DESCRIPTION

Figure 1:
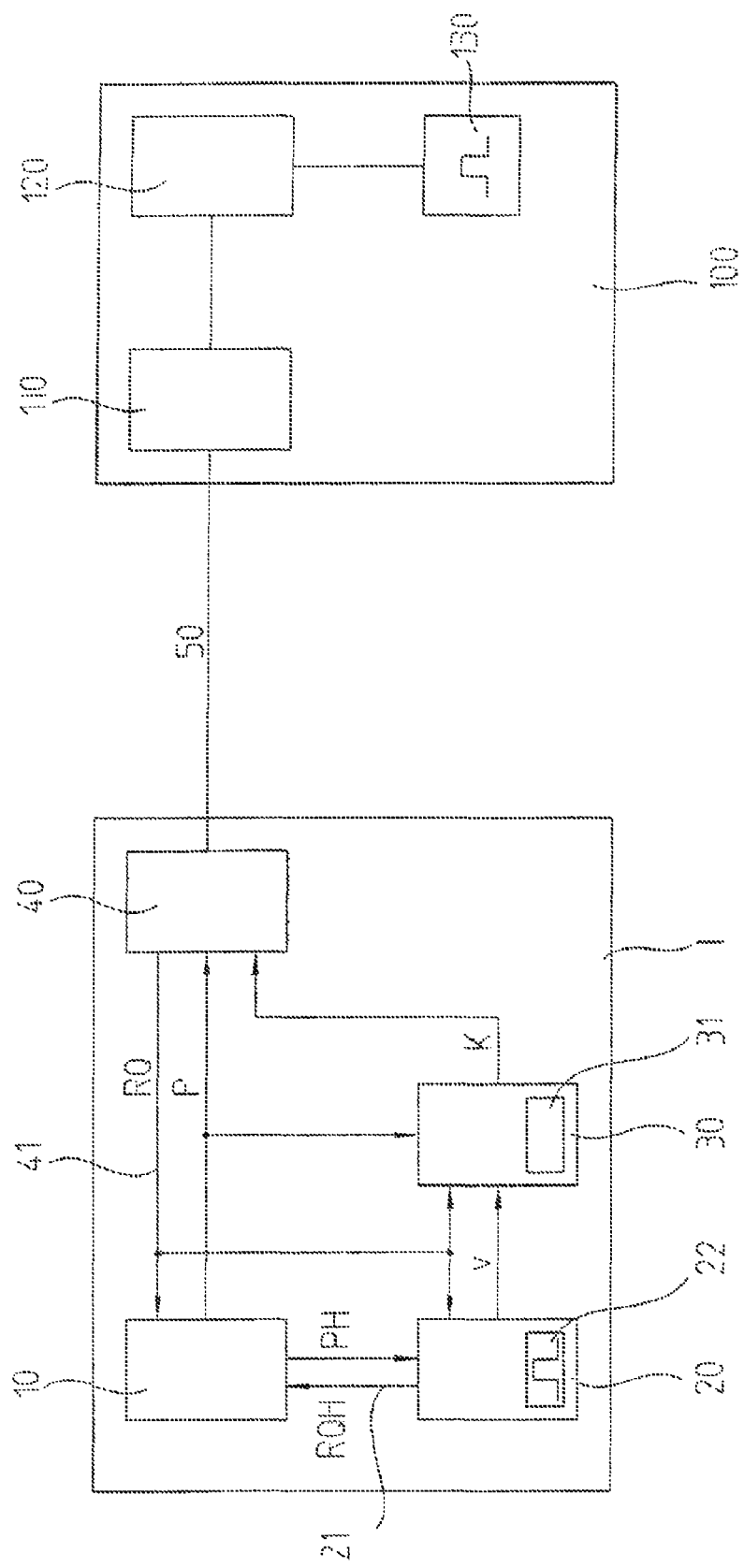
FIG. 1 is a block diagram of a position-measuring device according to an example embodiment of the present invention.

FIG. 1 is a block diagram of a position-measuring device 1 according to an example embodiment of the present invention. The position-measuring device 1 includes a position-measuring unit 10 for measuring position values of two objects disposed in a manner allowing movement relative to each other in a measuring direction, a movement-measuring unit 20 for ascertaining movement values of the two objects, an arithmetic logic unit 30 for ascertaining correction values from position values and movement values, as well as an interface unit 40. A data channel 50 connects interface unit 40 of position-measuring device 1 to an interface unit 110 of sequential electronics 100, e.g., a drive control 100. Drive control 100 further includes a controller unit 120 whose controller cycle time $T_R$ is determined by a controller clock generator 130.

In the present example, movement-measuring unit 20 is arranged as a velocity-measuring unit 20 with which velocity values v of the two objects disposed in a manner allowing movement relative to each other in a measuring direction are able to be measured. It should be appreciated that other movement values, e.g., acceleration values may be measured by movement-measuring unit 20.

For example, the two objects disposed movably relative to each other in a measuring direction may be the rotor and stator of an electric motor, or a tool carriage movably disposed on a supporting table of a machine tool. In the first case, the position values and velocity values are angular positions and angular velocities, while in the second case, linear positions and velocities are measured.

Data channel 50 and interface units 40, 110 of position-measuring device 1 and drive control 100, respectively, are implemented to provide bi-directional data transmission. For example, data-request instructions RQ may be sent from drive control 100 to position-measuring device 1, and data ascertained in position-measuring device 1 may be sent to drive control 100. A serial interface connection may be used as data channel 50, since in this case, the number of lines needed for the data transmission is small, and therefore the wiring complexity may be reduced. During continuous operation of drive control 100, that is, when, for example, the motor of a feeding axle of a machine tool or of a robot articulation is driven, data request instructions RQ are transmitted continuously at the interval of controller cycle time $T_R$. For example, typical controller cycle times $T_R$ are 50 µs to 2 ms.

Data-request instructions RQ are relayed in position-measuring device 1 from interface unit 40 via a data request line 41 to position-measuring unit 10, velocity-measuring unit 20 and arithmetic logic unit 30. If a data-request instruction RQ reaches position-measuring unit 10, position-measuring unit 10 ascertains an instantaneous position value $P_n$ and transmits instantaneous position value $P_n$ to interface unit 40 and arithmetic logic unit 30. In a similar manner, after receiving a data-request instruction RQ, velocity-measuring unit 20 ascertains an instantaneous velocity value v and transmits the instantaneous velocity value v to arithmetic logic unit 30. From instantaneous position value $P_n$, previous position value $P_{n-1}$ and known controller cycle time $T_R$, an average velocity $v_D$ which the controlled drive exhibited between previous position value $P_{n-1}$ to instantaneous position value $P_n$ is ascertainable in arithmetic logic unit 30 according to Equation 1:

$$v_D = (P_n - P_{n-1})/T_R \quad \text{(Equation 1)}$$

The value of average velocity $v_D$ is faulty, however, since the actual velocity characteristic is not taken into account, and therefore actual velocity value v at the desired measuring instant—in the present example, at the instant of the arrival of data-request instruction RQ—can deviate from average velocity $v_D$, and errors in position values $P_n$, $P_{n-1}$, e.g., quantization errors, are included in the calculation.

For example, the values for controller cycle time $T_R$ and previous position value $P_{n-1}$ may be stored in a memory 31 in arithmetic logic unit 30. For example, controller cycle time $T_R$ may be written into memory 31 by drive control 100 via data channel 50. In this case, position-measuring device 1 may be adapted very easily to different drive controls 100 having different controller cycle times $T_R$.

Controller cycle time $T_R$ may be measurable in arithmetic logic unit 30, so that, for example, variable controller cycle times $T_R$ may be taken into account, as well. Controller cycle time $T_R$ may be measured by a counter, for example, which is operated with a clock signal having a substantially shorter period duration than controller cycle time $T_R$. Controller cycle time $T_R$ may be calculated from the difference of the counter reading between two data-request instructions RQ and the period duration of the clock signal. For example, the sampling-clock signal of velocity-measuring unit 20, described in the description of FIG. 3, may be used as clock signal for operating the counter.

Instantaneous position value $P_n$, previous position value $P_{n-1}$ and controller cycle time $T_R$ are also available to drive control 100. Therefore, as described above, the value of average velocity $v_D$ may also be determined in drive control 100. Since, as also described above, average velocity $v_D$ thus ascertained may deviate in practice from the actual velocity of the drive at the instant of the query, but transmission of instantaneous velocity value v is undesirable because of the increased transmission time duration associated with it, arithmetic logic unit 30 ascertains a correction value K from average velocity $v_D$ and instantaneous velocity value v ascertained in velocity-measuring unit 20, and with the aid of correction value K, instantaneous velocity value v is ascertainable in drive control 100 using instantaneous position value $P_n$, previous position value $P_{n-1}$ and controller cycle time $T_R$. Correction value K has a substantially smaller data-word length than instantaneous velocity value v. Transmission of the information about instantaneous velocity value v is thereby made possible with moderate increase of the transmission time duration.

The data-word length of velocity value v is a function of several factors, including, the data-word length and therefore the resolution of position-measuring unit 10, the maximum allowed velocity, e.g., the maximum speed of a rotary position-measuring device, or the maximum feed rate of a linear position-measuring device, as well as the required resolution of velocity value v. For typical applications, the data-word length of velocity value v may be set in the range of the data-word length of instantaneous position value $P_n$, which may be 20 bits, for example.

It is possible for velocity value v ascertained in position-measuring device 1 to have a higher resolution than average velocity $v_D$ calculated according to equation 1. Correction value K transmitted to drive control 100 allows the velocity information to be transmitted with a higher resolution without significantly increasing the data volume.

Correction value K for the transmission of the velocity information may be both a position-correction value $K_P$, a movement-correction value $K_V$ (in the present example, a velocity-correction value $K_V$), and a time-correction value $K_T$. For example, a position-correction value $K_P$ is calculated according to Equation 2:

$$K_P = (v_D - v) * T_R \quad \text{(Equation 2)}$$

Therefore, velocity value v is calculated in drive control 100 according to Equation 3:

$$v = ((P_n - P_{n-1}) + K_P)/T_R \quad \text{(Equation 3)}$$

FIGS. 2a to 2c clarify the time advantage when transmitting movement information based on the example of the velocity information, using a position-measuring device 1 compared to conventional methods. FIG. 2a corresponds to a conventional variant, in which only position value P is transmitted, and the velocity is ascertained in the sequential electronics by calculating average velocity $v_D$, while in FIG. 2b, both position value P and velocity value v are transmitted, resulting in a significant increase in the transmission time. FIG. 2c shows the transmission of position value P and correction value K according to example embodiments of the present invention.

For example, the requested data may be transmitted in the form of data packets, each beginning with a starting sequence A and being concluded with an end sequence E. In this context, starting sequence A in a simplest case may be merely a start bit, but identification information, etc., may also be transmitted. End sequence E may include only one stop bit, or may include additional information, e.g., a checksum for assuring the data integrity (CRC, cyclic redundancy check).

The data packets are transmitted in response to the receipt of a data-request instruction RQ, which is merely indicated greatly simplified as an arrow in FIGS. 2a to 2c. The time interval between two successive data-request instructions RQ corresponds to controller cycle time $T_R$. For the sake of completeness, it should be pointed out that data-request instruction RQ may be sent as part of a data packet, and that a certain time may pass for processing the data in position-measuring device 1 between the arrival of data-request instruction RQ and the sending of the requested data. However, since this is equally true for FIGS. 2a to 2c, and is not particularly relevant, a detailed description is omitted.

As illustrated in FIG. 2a, the data packet includes starting sequence A, position value P and end sequence E. Transmission time duration $T_T$ necessary for transmitting the data packet from position-measuring device 1 to drive control 100 is very short, with the result that computing time $T_C$, which is available to drive control 100 for calculating the new setpoint values for the control loops for controlling the drive assigned to position-measuring device 1, is quite long. However, since in this case, as already discussed in detail above, drive control 100 has to rely on using average velocity $v_D$ between two successive position values P as actual value for the velocity, this variant is considered quite inaccurate.

On the other hand, referring to FIG. 2b, in addition to starting sequence A, position value P and end sequence E, the data packet also includes velocity value v ascertained in position-measuring device 1. Thus, exact velocity value v is available to drive control 100 for calculating the new setpoint values. Since the data-word length of velocity value v is in the range of the data-word length of position value P, this variant leads to a substantially longer transmission time duration $T_T$, i.e., to a shortening of computing time $T_C$ available to drive control 100. The result may be that compromises must be made with regard to computing accuracy when calculating the new actual values for the automatic control, or controller cycle time $T_R$ must be increased. Both impair the dynamics of the drive control, and are therefore considered to be undesirable.

FIG. 2c shows a data packet including starting sequence A, position value P, correction value K and end sequence E. Since the data-word length of correction value K for calculating velocity value v from position values P, controller cycle time $T_R$ and correction value K in drive control 100 may be selected to be substantially less than the data-word length of velocity value v, this variant leads only to a negligible increase in transmission time duration $T_T$ and thus to a negligible reduction of computing time $T_C$.

Various measuring principles may be used for ascertaining velocity value v in velocity-measuring unit 20. However, it is considered to be advantageous if velocity-measuring unit 20 uses position-measuring unit 10 to determine the actual characteristic of the position as a function of time by measuring auxiliary-position values PH. For this purpose, velocity-measuring unit 20 illustrated in FIG. 1 includes a sampling-clock generator 22 which generates a sampling-clock signal having a period duration $T_H$ that determines the time intervals at which auxiliary position values PH are requested from position-measuring unit 10. Auxiliary position values PH are requested with the aid of auxiliary-data request instructions RQH which are sent to position-measuring unit 10 via an auxiliary-position request line 21.

From each two sequentially measured auxiliary position values PH and known period duration $T_H$ of the sampling-clock signal, analogous to the calculation of average velocity $v_D$, it is possible to calculate auxiliary average velocities, with whose aid, by suitable extrapolation algorithms or interpolation algorithms such as, for example, spline interpolation or polynomial interpolation or other filter functions, an approximation function with respect to the actual velocity characteristic may be formed, and from that, in turn, velocity value v at a desired instant may be ascertained.

In this context, the sampling clock may have at least double the frequency of the controller clock, which means that at least two auxiliary position values PH are generated per measured position value $P_n$, $P_{n-1}$. Since the accuracy of the approximation in respect to the actual velocity characteristic rises with the number of auxiliary average velocities ascertained, i.e., the number of auxiliary position values PH measured, the aim should be for the highest possible frequency of the sampling-clock signal. Forming an obstacle to this is a limited processing speed of position-measuring unit 10, velocity-measuring unit 20 and arithmetic logic unit 30. Sufficient results may be attained if four times to 32 times the frequency of the controller clock signal is selected as the frequency for the sampling-clock signal.

With the aid of the velocity characteristic determined by the auxiliary average velocities, an acceleration value a may also be ascertained, that is, velocity-measuring unit 20 may be further arranged to form an acceleration-measuring unit 20.

Figure 3:
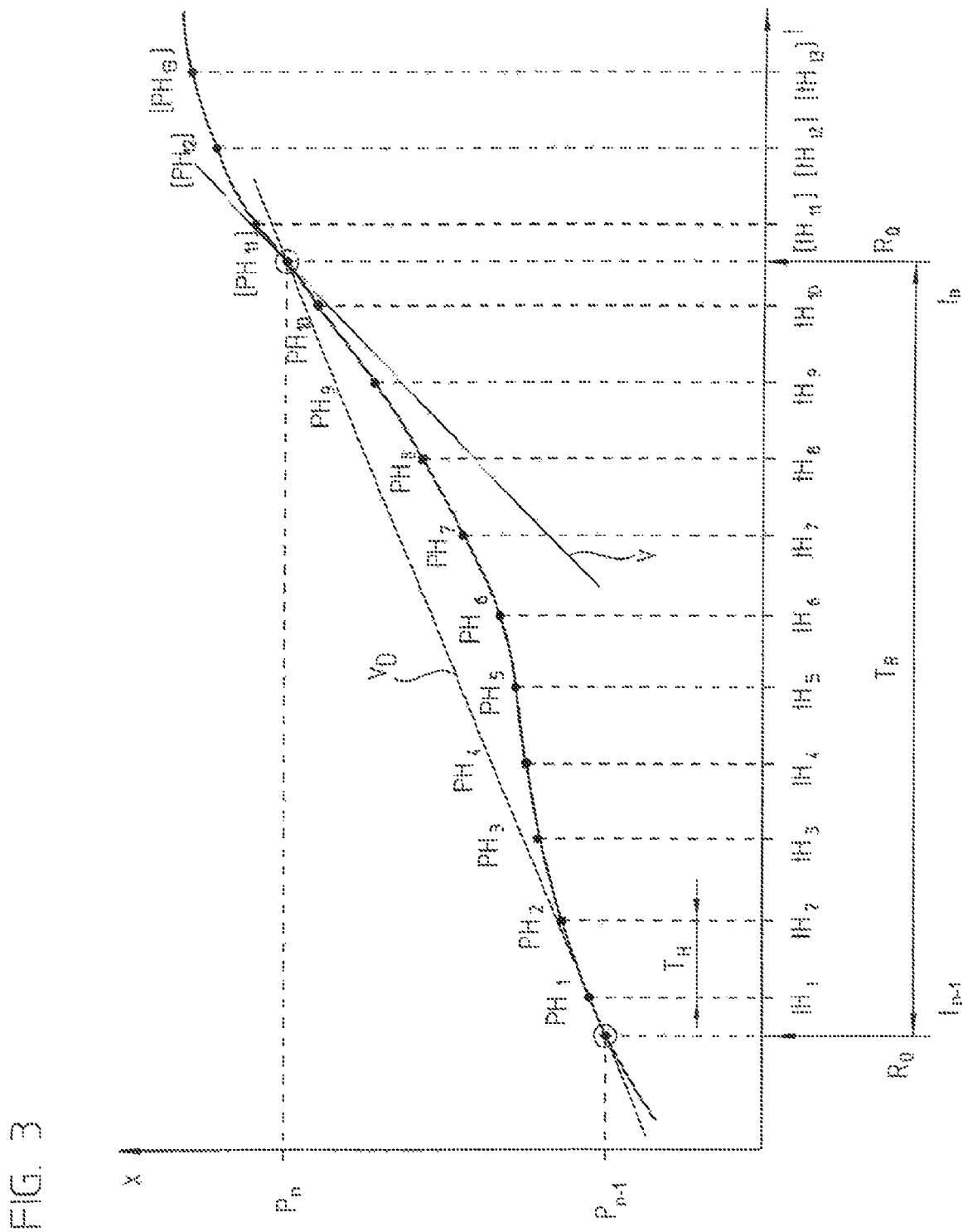
FIG. 3 illustrates an example for a position characteristic in a measuring direction X as a function of time t.

FIG. 3 shows an example for a position characteristic in a measuring direction X as a function of time t.

Instant $t_{n-1}$ identifies the instant at which previous position value $P_{n-1}$ was measured in the previous measuring cycle. Instantaneous position value $P_n$ is measured at instant $t_n$ in the current measuring cycle as a result of the arrival of a data-request instruction RQ from drive control 100. The interval between instants $t_{n-1}$ and $t_n$ corresponds to controller cycle time $T_R$. Average velocity $v_D$ is calculated as indicated in Equation 1 from previous position value $P_{n-1}$, instantaneous position value $P_n$ and known controller cycle time $T_R$. The value thus ascertained corresponds to the gradient of straight line $v_D$. However, actual velocity value v, e.g., at instant $t_n$, corresponds to the gradient of straight line v which represents a tangent with respect to the actual position characteristic at the position of instantaneous position value $P_n$.

Velocity-measuring unit 20 requests auxiliary position values $PH_1$ to $PH_{10}$ from position-measuring unit 10 at auxiliary instants $tH_1$ to $tH_{10}$ at intervals of period duration TH of the sampling-clock signal. In this example, the frequency of the sampling clock $f_H=1/T_H$ corresponds to ten times the frequency of the controller clock $f_R=1/T_R$. Velocity value v is formed at a defined instant, e.g., upon arrival of a data-request instruction RQ.

Since the sampling-clock signal and the controller clock signal are generated by different clock sources, first of all by sampling-clock generator 22 in position-measuring device 1, and secondly by controller clock generator 130 in drive control 100, in order to avoid beat effects, the clock signals may be able to be synchronized. For example, in position-measuring device 1, instants $t_n$, $t_{n-1}$ at which data-request instructions RQ arrive from drive control 100 may be used for the synchronization. If the sampling-clock signal has an integral multiple of the frequency of the controller clock signal, this further yields the advantage that measuring instant $t_n$ largely coincides with one of the measuring instants of auxiliary position values PH, and thus corresponding auxiliary position value PH may be equated with instantaneous position value $P_n$.

Auxiliary position values PH, which are measured after the arrival of data-request instruction RQ, may also be used for ascertaining velocity value v. This is indicated in FIG. 3 with auxiliary position values $PH_{11}$ to $PH_{13}$ which are measured at auxiliary instants $tH_{11}$ to $tH_{13}$ after data-request instruction RQ arriving at instant $t_n$. In particular, this may be used when, in response to a data-request instruction RQ, first instantaneous position value $P_n$ and subsequently correction value K are transmitted to drive control 100, since the time which is needed for transmitting instantaneous position value $P_n$ may be used for measuring further auxiliary position values PH and for ascertaining velocity value v or correction value K. In this manner, velocity information which corresponds to the velocity of the drive a defined time after arrival of data-request instruction RQ may be transmitted to drive control 100. An even more current velocity value v is thereby available as actual value to drive control 100. Furthermore, in this case, there is the possibility of ascertaining velocity value v by interpolation at an instant prior to that of the measurement of last auxiliary position value $PH_{13}$. In this manner, a higher accuracy is attainable for velocity value v than by extrapolation, which must be used when last auxiliary position value $PH_{13}$ is measured prior to the instant velocity value v is ascertained.

Position-measuring unit 10 may be both an incremental and an absolute system, and the physical scanning principle on which position-measuring unit 10 is based is not particularly relevant. Thus, for example, position-measuring unit 10 may be based on an optical, magnetic, inductive and/or capacitive measuring principles, etc.

The division of position-measuring device 1 into the function blocks position-measuring unit 10, velocity-measuring unit 20, arithmetic logic unit 30 and interface unit 40 is merely for the purposes of providing a better understanding. In practice, several, or perhaps all the function blocks may be integrated in one large-scale integrated, application-specific component (ASIC). Furthermore, a microcontroller may be used for providing at least a portion of the function blocks.

What is claimed is:

1. A position-measuring device, comprising:
    a position-measurement unit configured to measure position values of two objects movable relative to each other in a measurement direction;
    a movement-measurement unit configured to ascertain a movement value of the two objects; and
    an arithmetic logic unit configured to receive the position values and the movement value and to ascertain movement information in the form of a correction value suitable for calculation of the movement value in sequential electronics from an instantaneous position value, at least one previous position value, a controller cycle time that indicates a time interval between measurements of position values, and the correction value;
    wherein a data-word length of the correction value is substantially less than a data-word length of the movement value.

2. The position-measuring device according to claim 1, further comprising an interface unit connected to the position-measurement unit, the movement-measurement unit, and the arithmetic logic unit by a data-request line that is configured to transmit data-request instructions that arrive from the sequential electronics at the interface unit.

3. The position-measuring device according to claim 2, wherein the data-request instructions arrive at the interface unit at the interval of the controller cycle time.

4. The position-measuring device according to claim 1, further comprising an interface unit configured to receive the instantaneous position value and the correction value and to transmit the instantaneous position value and the correction value to the sequential electronics.

5. The position-measuring device according to claim 1, wherein the correction value corresponds to at least one of (a) a position-correction value, (b) a movement-correction value and (c) a time-correction value.

6. The position-measuring device according to claim 1, wherein the arithmetic logic unit includes a memory configured to store at least one of (a) the controller cycle time and (b) the position values.

7. The position-measuring device according to claim 1, further comprising an interface unit connected by a data channel to an interface unit of the sequential electronics.

8. The position-measuring device according to claim 7, wherein the data channel is arranged as a serial interface connection.

9. The position-measuring device according to claim 1, wherein the movement-measurement unit includes a sampling-clock generator configured to generate a sampling-clock signal having a period duration, and the movement-measurement unit is connected to the position-measurement unit by an auxiliary-data request line, auxiliary position values requestable from the position-measurement unit by auxiliary-position request instructions.

10. The position-measuring device according to claim 9, wherein the auxiliary position values are requestable at an interval of the period duration of the sampling-clock signal, the movement-measurement unit configured to receive the auxiliary position values and to ascertain the movement value at a measurement instant by forming an approximation function of a movement characteristic from the auxiliary position values and the period duration of the sampling-clock signal.

11. The position-measuring device according to claim 1, wherein the movement-measurement unit is arranged as a velocity-measurement unit, and the movement value includes a velocity value.

12. A method, comprising:
    measuring an instantaneous position value of two objects, movable relative to other in a measuring direction, in a position-measurement unit of a position-measuring device;
    ascertaining a movement value of the two objects in a movement-measurement unit of the position-measuring device; and
    ascertaining a correction value in an arithmetic logic unit of the position-measuring device, the movement value calculatable in accordance with the correction value in sequential electronics from the instantaneous position value, at least one previous position value measured in a previous measuring cycle, and a controller cycle time that indicates a time interval between measurements of position values;
    wherein a data-word length of the correction value is substantially less than a data-word length of the movement value.

13. The method according to claim 12, wherein the instantaneous position value, the movement value, and the correction value are ascertained after receipt of a data-request instruction transmitted from the sequential electronics to an interface unit of the position-measuring device.

14. The method according to claim 12, further comprising transmitting the instantaneous position value and the correction value to the sequential electronics by an interface unit of the position-measuring device.

15. The method according to claim 12, wherein the correction value corresponds to at least one of (a) a position-correction value, (b) a movement-correction value, and (c) a time-correction value.

16. The method according to claim 12, wherein the movement-measurement unit includes a sampling-clock generator configured to generate a sampling-clock signal having a period duration, and the movement-measurement unit is connected to the position-measurement unit by an auxiliary-data request line, by which auxiliary position values are requestable from the position-measurement unit based on auxiliary-position request instructions, the movement value is ascertained by:

requesting auxiliary position values at an interval of the period duration of the sampling-clock signal;

forming auxiliary movement values from the auxiliary position values and the period duration of the sampling-clock signal;

forming an approximation function of a movement characteristic from the auxiliary movement values; and ascertaining the movement value at a measuring instant from the approximation function.

17. The method according to claim 12, wherein the movement-measurement unit is arranged as a velocity-measuring unit configured to ascertain a velocity value as the movement value.

18. The method according to claim 12, wherein the movement value includes a velocity value.

\* \* \* \* \*